United States Patent
Cawley et al.

(10) Patent No.: US 11,301,416 B2
(45) Date of Patent: Apr. 12, 2022

(54) SINGLE-CHIP MULTI-PROCESSOR COMMUNICATION

(71) Applicant: DISPLAYLINK (UK) LIMITED, Cambridge (GB)

(72) Inventors: Robin Alexander Cawley, Newbury (GB); Colin Skinner, Cambridge (GB); Eric Kenneth Hamaker, Cambridge (GB)

(73) Assignee: DISPLAYLINK (UK) LIMITED, Cambridge (GB)

( * ) Notice: Subject to any disclaimer, the term of this patent is extended or adjusted under 35 U.S.C. 154(b) by 0 days.

(21) Appl. No.: 15/576,680

(22) PCT Filed: May 24, 2016

(86) PCT No.: PCT/GB2016/051489
§ 371 (c)(1),
(2) Date: Nov. 22, 2017

(87) PCT Pub. No.: WO2016/189294
PCT Pub. Date: Dec. 1, 2016

(65) Prior Publication Data
US 2018/0137082 A1 May 17, 2018

(30) Foreign Application Priority Data
May 27, 2015 (GB) .................... 1509076

(51) Int. Cl.
*G06F 15/80* (2006.01)
*G06F 9/38* (2018.01)
(Continued)

(52) U.S. Cl.
CPC ........ *G06F 15/8038* (2013.01); *G06F 9/3877* (2013.01); *G06F 13/4282* (2013.01); *G06F 15/163* (2013.01)

(58) Field of Classification Search
CPC .. G06F 15/8038; G06F 15/153; G06F 15/167; G06F 13/00; G06F 9/3877; G06F 15/163; G06F 13/42; G06F 13/4282
See application file for complete search history.

(56) References Cited

U.S. PATENT DOCUMENTS 6,337,852 B1  1/2002  Desnoyers et al.
6,490,642 B1  12/2002  Thekkath et al.
(Continued)

FOREIGN PATENT DOCUMENTS

EP         0526911      2/1993
EP         1128275      8/2001
WO    WO 2005/103934   11/2005

OTHER PUBLICATIONS

Chiu et al., "The Rendezvous Mechanism for the Multi-Core AMBA System", International Conference on Parallel Processing Workshops, Sep. 22-25, 2009, pp. 574-578, IEEE, Piscataway, New Jersey, U.S.A.

(Continued)

*Primary Examiner* — Courtney P Carmichael-Moody
(74) *Attorney, Agent, or Firm* — Paradice & Li LLP

(57) ABSTRACT

A heterogeneous multi-core integrated circuit comprising two or more processors, at least one of the processors being a general purpose CPU and at least one of the processors being a specialized hardware processing engine, the processors being connected by a processor local bus on the integrated circuit, wherein the general purpose CPU is configured to generate a first instruction for an atomic operation to be performed by a second processor, different from the general purpose CPU, the first instruction comprising an address of the second processor and a first command indicating a first action to be executed by the second processor, and transmit the first instruction to the second processor over the processor local bus. The first (Continued)

command may include the first action, or may be a descriptor of the first action or a pointer to where the first action may be found in a memory.

12 Claims, 4 Drawing Sheets

(51) Int. Cl.
    *G06F 15/163*      (2006.01)
    *G06F 13/42*      (2006.01)

(56) References Cited

U.S. PATENT DOCUMENTS

| | | |
|---|---|---|
| 7,577,820 B1 | 8/2009 | Wentzlaff et al. |
| 2004/0117743 A1* | 6/2004 | Gehman .......... G06F 30/30 716/102 |
| 2007/0234006 A1* | 10/2007 | Radulescu ........ G06F 15/7825 712/28 |
| 2008/0222389 A1 | 9/2008 | Bruce et al. |
| 2009/0157935 A1 | 6/2009 | Worthington et al. |
| 2009/0165014 A1* | 6/2009 | Park .............. G06F 9/5088 718/105 |
| 2009/0235004 A1 | 9/2009 | Dang et al. |
| 2011/0296437 A1* | 12/2011 | Raut .............. G06F 9/526 719/314 |
| 2013/0042248 A1* | 2/2013 | Gargash .......... G06F 9/526 718/102 |
| 2013/0090887 A1* | 4/2013 | Deogharia ..... G01R 31/318555 702/120 |
| 2015/0178086 A1* | 6/2015 | Hughes .......... G06F 9/3004 711/125 |
| 2016/0342566 A1* | 11/2016 | Lee .............. G06F 13/4295 |
| 2019/0347125 A1* | 11/2019 | Sankaran .......... G06F 9/4881 |

OTHER PUBLICATIONS

Xiao et al., "Hybrid Shared-memory and Message-passing Multiprocessor System-on-Chip for UWB MAC", International Conference on Consumer Electronics (ICCE), Jan. 13-16, 2012, pp. 658-659, IEEE, Piscataway, New Jersey, U.S.A.

\* cited by examiner

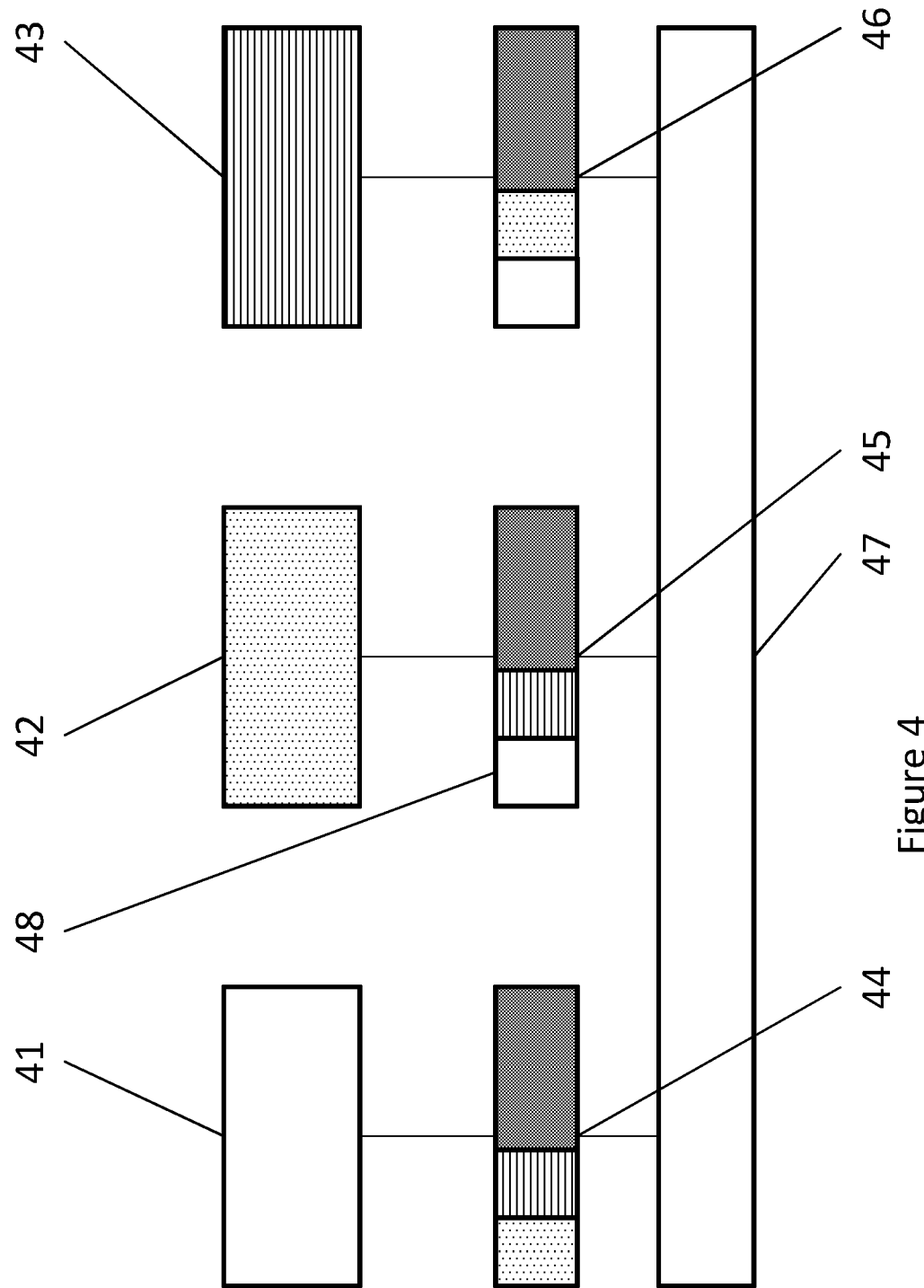

SINGLE-CHIP MULTI-PROCESSOR COMMUNICATION

CROSS-REFERENCE TO RELATED APPLICATION

This application is a U.S. National Stage patent application of International Patent Application No. PCT/GB2016/051489, filed on May 24, 2016, the benefit of which is claimed, and claims priority to Great Britain Patent Application No. 1509076.4 entitled "Single-Chip Multi-Processor Communication", which was filed May 27, 2015, each of which are hereby incorporated by reference in their entirety.

FIELD OF INVENTION

The invention provides methods and apparatus for improving the efficiency of communication between multiple processors and data-handling engines within an integrated circuit.

BACKGROUND

In modern computing, it is common for data processing and production to be carried out by several processors on a single integrated circuit or chip. Such integrated circuits are often known as multi-core chips and may include multiple general-purpose processors ("CPUs") and specially-designed hardware processing engines, which may each be designed (optimised) for particular tasks such as coding and decoding as well as input and output, whereupon the chip is often called heterogeneous. The use of multiple processors, whether CPUs and/or specialized hardware processing engines, allows parallel processing to be carried out, which improves the speed of processing, but means that communication between the various processors is needed to ensure that the system is being used as efficiently as possible and to avoid problems caused by, for example, data being processed out of order.

The current-art methods of on-chip communication include polling and interrupts. Polling means that a CPU sends signals to other CPUs or appropriate engines and awaits a response that indicates, for example, that the other CPU or engine is ready to receive data. This results in inefficiencies because the signalling CPU must wait for a response, which introduces delay. It also uses processing power that could be more usefully used for other tasks.

An interrupt is a signal sent down a dedicated wire built into an integrated circuit. This means that not only are such dedicated lines necessary, but signals can only be sent to specific places, which may not be desirable if other destinations are required.

Message Signal Interrupts (MSIs) are an alternative type of interrupt. The effect of the MSI is to set an interrupt line/request locally at the controlling processor, so it is the equivalent of an interrupt line without requiring the special dedicated wiring. An MSI comprises a data packet arranged in a specific format containing a small amount of data and an instruction, and is sent between integrated circuits. Such MSIs are very strictly defined, which makes it difficult to use them for varied purposes.

In either case, a controlling processor commands a device to perform an action by performing one or more register writes. When the action completes, the device notifies the processor that it requires attention. It does this by asserting an interrupt line or sending an MSI containing an interrupt number, depending on which interrupt method is in use. The CPU detects, by architecture-dependent means, that the interrupt line/request has been set, and performs one or more register reads on the device to determine the reason for the interrupt, and if necessary extract data from the device.

Some less-commonly-used methods of on-chip communication are barriers and hardware semaphores, which comprise a serial link between CPUs. These depend on a routing mechanism and are also serial in nature, meaning only one message can be sent at a time. This introduces delay.

In all cases, memory locks are likely to be required in order to protect data from being changed by another CPU or engine (collectively known as data handlers) before the signal has been dealt with. This may result in interference between data handlers as a locked area of memory cannot be accessed in any way. Both types of signals are also only used between pairs of data handlers; they cannot be forwarded on.

Thus, although it is known for multiple data handlers to be present in an integrated circuit, there is no known efficient way to co-ordinate them. The present invention aims to address this problem.

SUMMARY

Accordingly, in a first aspect, the invention provides a heterogeneous multi-core integrated circuit comprising two or more processors, at least one of the processors being a general purpose CPU and at least one of the processors being a specialized hardware processing engine, the processors being connected by a processor local bus on the integrated circuit, wherein the general purpose CPU is configured to: generate a first instruction for an atomic operation to be performed by a second processor, different from the general purpose CPU, the first instruction comprising an address of the second processor and a first command indicating a first action to be executed by the second processor; and transmit the first instruction to the second processor over the processor local bus.

According to a second aspect, the invention provides a method of communication on a heterogeneous multi-core integrated circuit comprising two or more processors, at least one of the processors being a general purpose CPU and at least one of the processors being a specialized hardware processing engine, the processors being connected by a processor local bus on the integrated circuit, wherein the method comprises: generating, by general purpose CPU, a first instruction for an atomic operation to be performed by a second processor, different from the general purpose CPU, the first instruction comprising an address of the second processor and a first command indicating a first action to be executed by the second processor; and transmitting the first instruction to the second processor over the processor local bus.

In one embodiment, the first command comprises at least one descriptor indicating what the first action comprises. The first command may comprise a pointer to at least one descriptor located in memory indicating what the first action comprises. In one embodiment, the first instruction comprises data on which the first action is to be performed, when executed. The first instruction may comprise a pointer to data located in memory on which the first action is to be performed, when executed.

In one embodiment, the general purpose CPU is configured so that the first instruction cannot be generated until any data required for execution of the first action is available.

The general purpose CPU is, in one embodiment, further configured to: receive, over the processor local bus, a second instruction from another processor for an atomic operation to be performed by the general purpose CPU, the second instruction comprising an address of the general purpose CPU and a second command indicating a second action to be executed by the general purpose CPU; and execute the second action.

In one embodiment, the second action is the generation of the first instruction, wherein the second instruction includes the address of the second processor. The second instruction may include the first command for inclusion in the first instruction.

In one embodiment, the heterogeneous multi-core integrated circuit further comprises an input buffer for storing the received second instruction until the second instruction is read by the general purpose CPU and the second action is executed.

The first instruction may include information indicating the amount of space available in the input buffer for storage of other instructions.

In one embodiment, the processor local bus comprises any one of a Wishbone Bus, a CoreConnect bus or an Advanced Microcontroller Bus Architecture, AMBA, Bus, for example an Advance eXtensible Interface, AXI, Bus.

The second processor may be a general purpose CPU or a specialized hardware processing engine.

In one embodiment, the specialized hardware processing engine is configured to process signals that are formatted in Universal Serial Bus, USB, protocol.

According to another aspect of the invention, there is provided a method of communication between data handlers using a distributed signalling mechanism (DSM) comprising: a first data handler preparing a DSM signal comprising an atomic data write over a general-purpose communication bus between a known source and a known destination, the first data handler also adding an identification of a second data handler which is configured such that it will be able to correctly interpret the received DSM signal; the first data handler placing the DSM signal on a general-purpose intra-chip communication medium; the DSM signal being sent to the second data handler as a data write using the conventional mechanism for the medium; and the second data handler receiving the DSM signal and acting on it; wherein one or both of the data handlers are CPUs.

The DSM signal, in one embodiment, acts as an immediate notification that a process is complete or that a process can be started. This means that there will be rules in place preventing the DSM signal from being prepared until all relevant data is ready.

In this context, an atomic data write is defined as data written to a memory location via an operation that cannot be broken up into smaller parts and therefore cannot be interrupted by other processes. This prevents so-called 'race conditions', whereby it is impossible to predict which of two processes being carried out by two data handlers will be finished first. Since the data write that forms a DSM signal is atomic, once it begins it appears to be instantaneous and is uninterruptable. It is therefore predictable.

This method is beneficial because it provides a method of communication that does not require polling or the use of dedicated interrupt lanes. The fact that the DSM signal carries its own data in an atomic form is beneficial because it means that vital data will not be changed or overwritten but removes the need for a lock that might interfere with other data handlers, thus also allowing multiple data handlers to work on the same data. As a further benefit, this method is easy to scale, meaning that a system implementing this method can be very large, comprising multiple data handlers, without the number of connections required becoming unwieldy as would be the case under any of the current-art systems.

The DSM signal, in one embodiment, contains a pointer to a descriptor: a piece of stored data that identifies how other data is to be processed and stored, but can contain any data or commands in any combination required for effective communication between data handlers. Examples include:
- A command and data on which the command should be carried out
- A command and a pointer to a memory location where data is stored
- A combination of one or more pointers to descriptors and data
- Data on which the data handler should carry out a pre-defined function
- A flag indicating success or failure of another function Other formats or data may be included up to the maximum size of the DSM signal, depending on the exact embodiment.

In one embodiment, the preparation of a DSM signal is triggered by receiving a DSM signal from a third data handler. This may be through a command contained within the DSM signal itself or as a result of instructions fetched from memory. This is beneficial because it means that the destination and contents of a DSM signal can be programmed rather than needing to be known in advance as part of the main instructions executed by the data handler.

In one embodiment, the second and third data handlers are different data handlers. This allows chaining of DSM signals, which is beneficial because it means that instead of there being a single controlling data handler that sends a DSM signal to a second data handler and waits for a response before sending a second DSM signal to a third data handler, it is possible for a first data handler to send a single DSM signal and wait for data to be fully processed in a co-ordinated manner by an entire pipeline. This leads to more efficient coordination and avoids unnecessary messaging which uses processing power and space in the local communication media. It also improves timing as a DSM signal will not be sent until data has been prepared and all relevant functions have been completed, as aforementioned, but once this is the case it will be sent immediately. This means that all data handlers in a chain will be notified of prepared data and able to access it as promptly as possible.

In one embodiment, more than one DSM signal may be prepared as a result of a single set of instructions. This is beneficial because it allows a data handler to send messages to multiple other data handlers as may be appropriate and there is no need for repetition, improving efficiency.

In one embodiment, the method includes preventing an excessive number of DSM signals from being sent to a data handler, comprising the inclusion of 'credits' within the DSM signal to inform other data handlers of the space available in a notional queue. This is beneficial as it means that error prevention methods can be put in place to avoid a data handler becoming swamped by an excessive number of DSM signals, which might lead to delays and potentially lost data, which could in turn lead to instructions not being carried out.

In one embodiment there are different methods depending on the data handlers in question, for example one method for 'intelligent' CPUs sending to 'dumb' engines and a second method where CPUs are communicating with one another.

In one embodiment, a CPU ("DH1") may send a command via DSM signal to a dumb device ("DH2") knowing that it will generate a known non-zero number of responses. DH1 is aware of the size of the input buffer associated with DH2 (or at least a part of the input buffer accessible by DH1) as well as the size of its own input buffer and will therefore not issue commands until all necessary buffers have enough space. The awareness of the space in the respective buffers constitutes the 'credits' and therefore in this part of the system the method of sending 'credits' in the DSM signal is not used.

In one embodiment, where one CPU ("DH3") is communicating with a second CPU ("DH4") an alternative method is provided whereby DH3 allocates a number of 'slots' in its DSM input buffer that are reserved for DSM signals from DH4 and includes the number of available slots in each DSM signal it sends to DH4. Assuming that there is a consistent exchange of messages, DH4 will be regularly updated on the number of slots DH3 has available for its DSMs and vice versa. Neither data handler will send a DSM signal if there is no space at its destination.

In one embodiment, there is further provided a method whereby, where there is little traffic between DH3 and DH4 as described above, DH3 may send a blank DSM signal carrying only the information on the credits it has available for DH4 and vice versa.

These example methods are described as part of the same embodiment, but could also be used separately.

Advantageously, there may be provided a method whereby an incoming DSM signal may be copied into local memory and replaced with a reference to the location in memory where the contents of the DSM signal can be found. This dramatically increases the number of DSM signals that can be 'stored' in an input buffer.

According to a further aspect of the invention, there is provided a data handler comprising: a data input arranged to fetch or receive data for processing; a processor or engine arranged to execute instructions according to its function and prepare a DSM signal according to a method as described above; optionally, an output for processed data; and an output for DSM signals.

This arrangement is beneficial because it allows a data handler to be controlled using DSM signals. The use of an input buffer is particularly beneficial as it allows the data handler to handle DSM signals in the order in which they were received and the data handler sending the DSM signal does not need to check if it was received; it is guaranteed to be received and eventually handled.

According to a still further aspect of the invention, there is provided a data handler comprising: a data input arranged to fetch or receive data for processing; a message input arranged to receive a DSM signal that has been produced according to a method as described above; a buffer arranged to store received DSM signals and release them in the order in which they were received; a processor or engine arranged to fetch a DSM signal from the buffer, process the DSM signal as appropriate, depending on its contents, optionally, prepare a further DSM signal according to a method as described above, optionally, an output for processed data, and, optionally, an output for further DSM signals.

In one embodiment, the 'credits' mentioned above comprise the amount of space left in the input buffer.

According to another aspect of the invention, there is provided a system for processing data comprising: two or more data handlers as described above; at least one memory arranged to hold data before it is processed; at least one memory arranged to hold data after it is processed; a bus connected to all the data handlers and arranged to carry DSM signals; a bus connected to all the data handlers and the memories and arranged to carry data; and one or more data outputs.

The memories arranged to hold data before and after it is processed may comprise separate memories or may be different areas of the same memory, or the data may be interleaved within a single area of memory. The data may be processed by multiple data handlers.

In one embodiment, the bus used to carry DSM signals is arranged according to the Advanced Extensible Interface (AXI) standard. This is beneficial because the AXI standard is already widely implemented in integrated circuits, which means that the methods of the invention will be easier to deploy and use. It is also less used for other types of data while at the same time commonly being fast enough and having sufficient bandwidth to allow a significant amount of data to be sent as the atomic write needed for a DSM signal.

The busses arranged to carry data and DSM signals may be separate busses or may be the same bus. However, in one embodiment, the DSM signal and any data output are transmitted over the same bus which has a guaranteed 'flight time' for data written on it. This is beneficial as it means that if the first data handler writes data to local memory and then sends a DSM signal relating to that data, it can guarantee that by the time the DSM signal arrives the data write will be complete. This means that there is no need for the first data handler to wait for a confirmation, reducing latency.

This is a further benefit of the use of an AXI bus: the bus is able to carry data and descriptors as well as DSM signals and, as a result, it is possible to send the DSM signal directly after sending data and/or descriptors to memory as appropriate, thus ensuring that the DSM signal will arrive at its destination after the data and/or descriptors.

In one embodiment, the system is arranged such that all data handlers and memory appear to be sections of memory and have memory addresses. The addressing system used to send DSM signals to the appropriate data handlers therefore operates as if they were being written to memory. This is beneficial as it takes advantage of existing methods, which makes implementation more straightforward.

In one embodiment, the system is embodied as an integrated circuit on a single computer chip, but the method of the first aspect of the invention could also be used for signalling between different integrated circuits if a suitable bus is provided.

BRIEF DESCRIPTION OF THE DRAWINGS

Embodiments of the invention will now be more fully described by way of example, with reference to the drawings, of which:

FIG. 4 schematically shows another embodiment of a system according to the invention.

DETAILED DESCRIPTION

Figure 1:
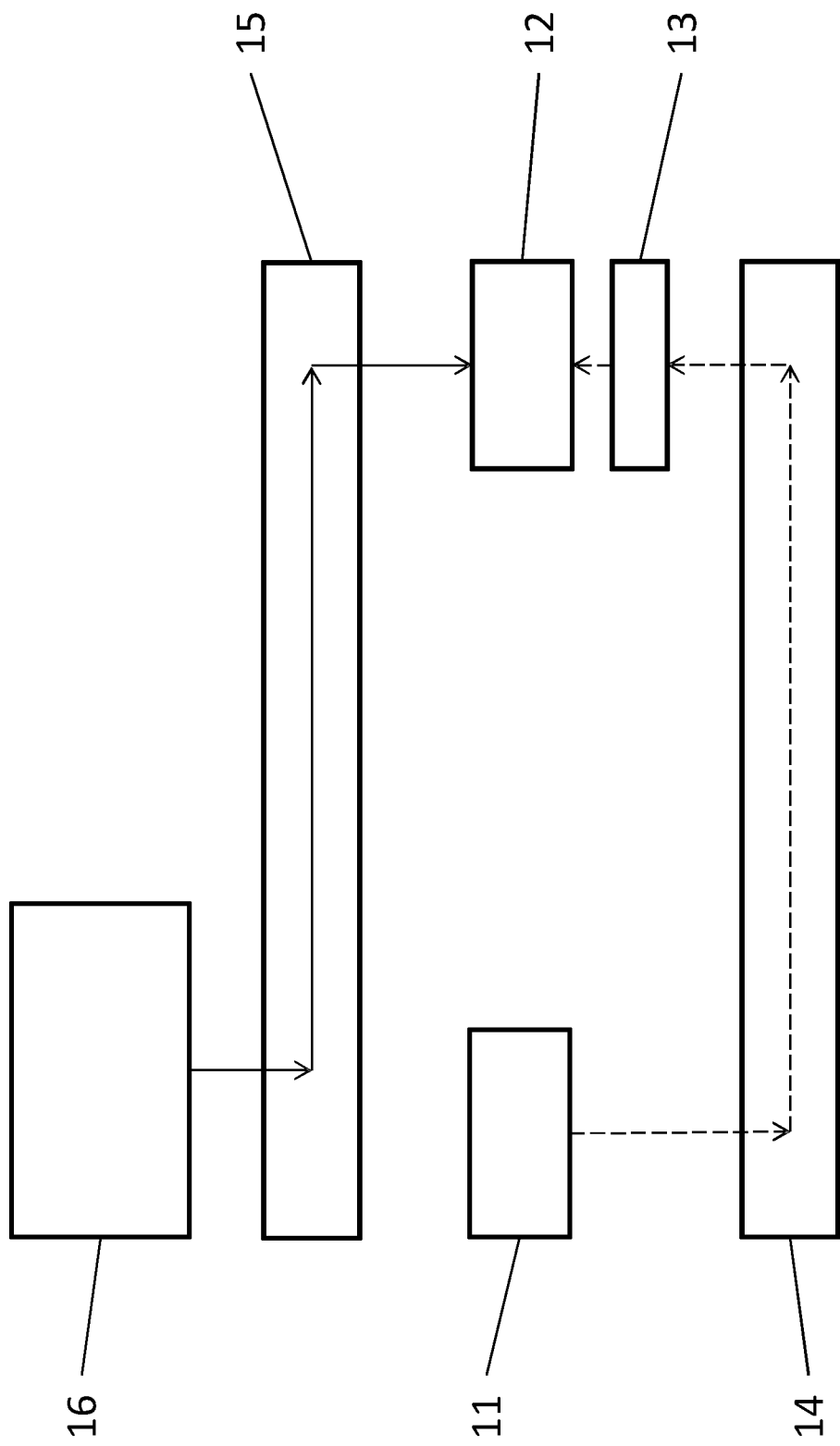
FIG. 1 schematically shows movement of data and DSM signals between two data handlers according to an embodiment of the invention.

FIG. 1 shows a simple version of a system according to one embodiment of the invention comprising an integrated circuit having two data handlers [11, 12], such as a CPU and a specialised hardware processing engine, connected by a bus [14] that carries DSM signals. The second data handler [12] is further shown with a DSM signal buffer [13]. The first data handler [11] would also have such a buffer, but it is not shown here for clarity. There is also a second bus [15] which is connected to data memory [16] and to the two data handlers [11, 12]. There would also be other components in the system, but for clarity these are not shown.

A DSM signal is a register write to the address of the second data handler's input FIFO [13], which is programmed as part of the function being carried out by the first data handler [11]. The data being written is not pre-programmed, but is a combination of data pre-programmed in the same way as the address and data generated by the first data handler [11], usually but not always some form of status. The exact combination is defined by the needs of the system with regard to the needs of the particular data handlers [11, 12]. Typically, there will be an identification of the command that has completed and the first data handler [11] will also insert other data as appropriate to indicate the status of the completed command. Both data handlers [11, 12] must have been configured such that they have a common format, such that the second data handler [12] will be able to interpret DSM signals sent by the first data handler [11].

When the DSM signal is sent by the first data handler [11], it is placed on the message bus [14] addressed such that it is written into the second data handler's DSM signal buffer [13]. If there are already other DSM signals in the buffer [13], the new DSM signal will be placed at the back of a notional queue; otherwise it may be fetched from the buffer and handled immediately. The route of the DSM signal is shown by the dashed arrows.

If either data handler [11, 12] requires data for processing, this is fetched from memory [16] via, in this embodiment, a second bus [15]. Because the DSM signal will not be sent until the data is ready, the data is guaranteed to be present and the data handler that needs the data is able to fetch the data without any further delay. In FIG. 1, the route of fetched data is shown by the plain arrows and only includes the second data handler [12] although, of course, the first data handler [11] would also be connected to the data bus [15].

Figure 2:
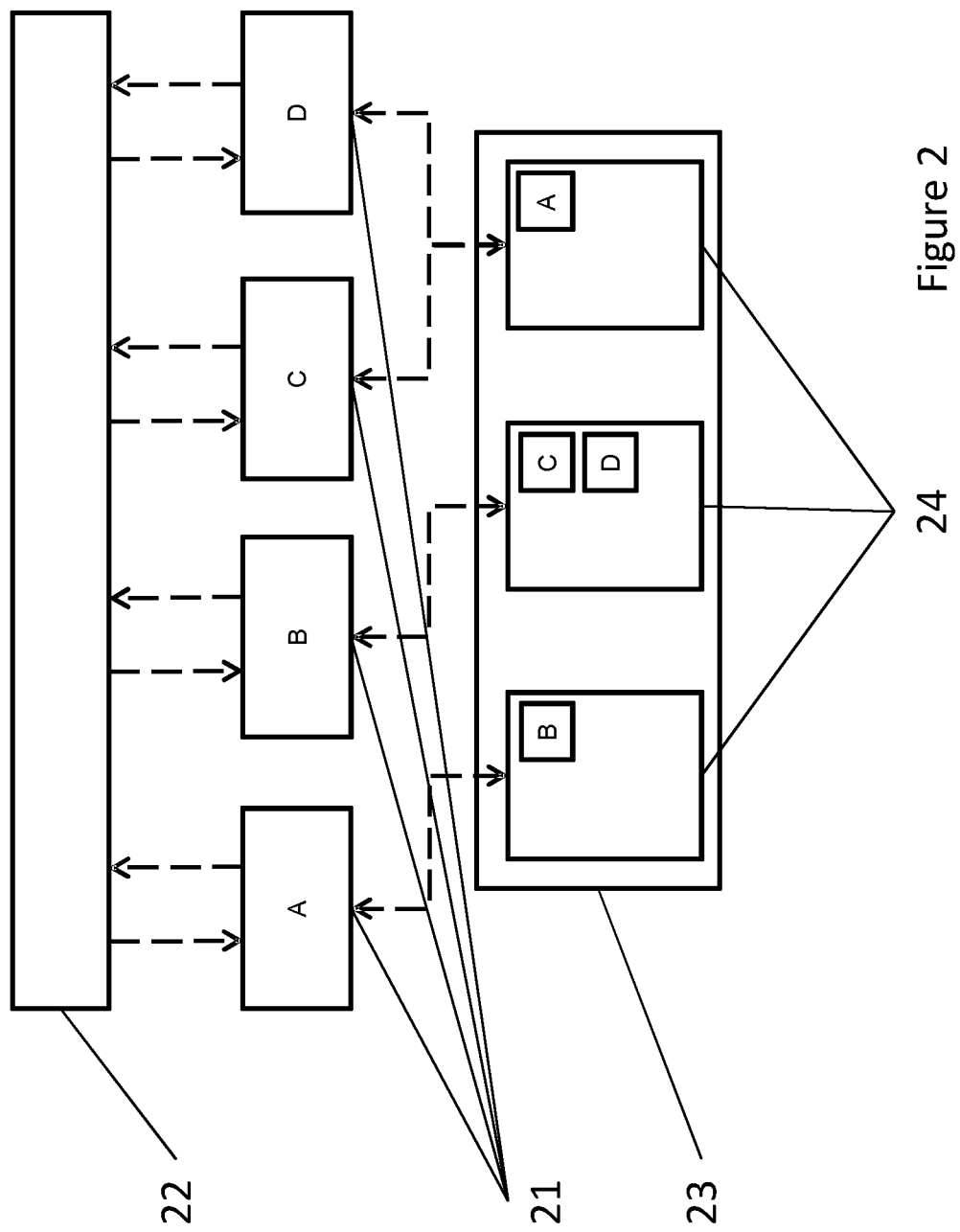
FIG. 2 shows a schematic of a system involving four data handlers and an instruction memory.

FIG. 2 shows another embodiment, which is a more complex version of the system comprising an integrated circuit having four data handlers [21], a bus configured to carry DSM signals [22] connected to the data handlers through the paths shown by dashed arrows, and an instruction memory [23] holding instruction sets in the form of descriptors [24], which are fetched along the paths shown by dashed arrows. There will, of course, be other components, but these are not shown for clarity.

Figure 3:
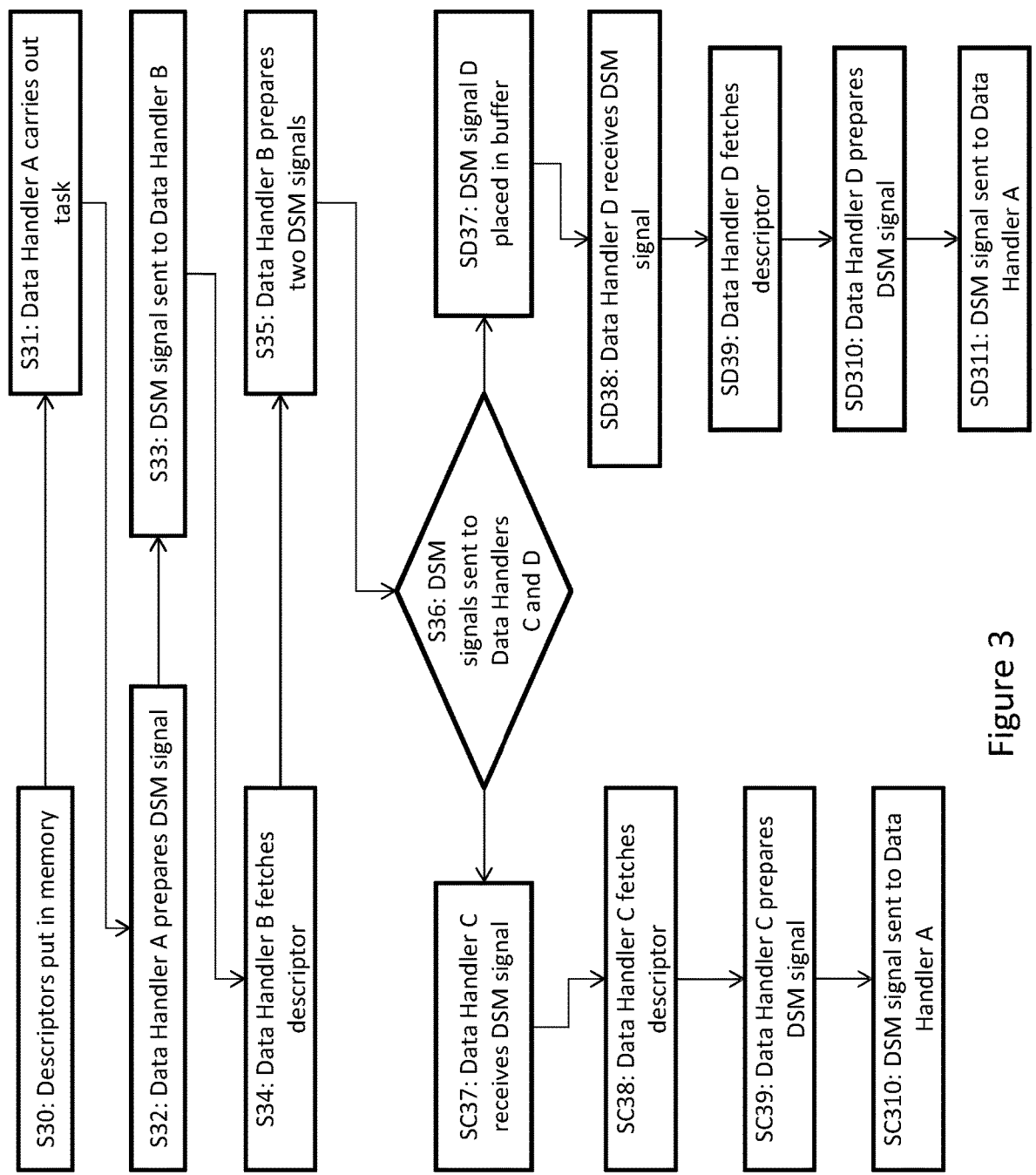
FIG. 3 is a flowchart of a process carried out by the system of FIG. 2.

FIG. 3 is a flowchart showing an example of the process in this embodiment, with reference, also, to FIG. 2.

At Step S30, the system is booted and configured and descriptors [24] are loaded into memory. Each descriptor [24] contains instructions for data processing and the production of a DSM signal to be sent to an address contained in the descriptor [24]. In FIG. 2, these addresses are shown by the lettered boxes within the descriptors [24].

In this embodiment, the descriptors are created at start-up, but they can also be written on the fly in order to provide maximum flexibility. They may also be amended according to, for example, selection of display output standards to be used.

At Step S31, Data Handler A [21A], which is a CPU, carries out a task according to its respective descriptor [24].

At Step S32, Data Handler A [21A] prepares a DSM signal to be sent to the address stored in the descriptor [24] that it was executing: in this example, that of Data Handler B [21B]. It will only do this if it knows that there is enough space in Data Handler B's message buffer and also in the message buffers of Data Handlers C and D, since it knows that Data Handler B's descriptor will trigger the production of DSM signals sent to Data Handlers C and D. The DSM signal will also contain instructions for Data Handler B [21B] to execute the appropriate descriptor stored in memory [23], and is placed on the bus [22] to be written to the message buffer associated with Data Handler B [21B] at Step S33.

At Step S34, Data Handler B [21B] receives the DSM signal from Data Handler A [21A] and, as instructed, fetches the described descriptor [24] from memory [23]. It then executes the instructions therein, which include an instruction to prepare two DSM signals addressed to Data Handlers C and D [21C, 21D], in the same way as Data Handler A [21A] did. In this way, DSM signals can be chained such that the receipt of one DSM signal triggers the sending of another. The DSM signals are sent at Step S36. Data Handler B can be sure that there is space in Data Handler C and D's message buffers, as otherwise Data Handler A would not have sent the original DSM signal that began the chain.

At Step SC37, Data Handler C [21C] receives its DSM signal and fetches its descriptor [24] at Step SC38. It then executes the instructions in the descriptor [24], which include preparing a DSM signal at Step SC39 to be sent back to Data Handler A [21A] at Step SC310. This means that Data Handler A [21A] will be notified that this limb of the process is complete and the receipt of this DSM signal may trigger a further process, or alternatively Data Handler A [21A] may wait to receive a DSM signal from Data Handler D [21D] indicating that the entire process is complete.

In this example, Data Handler D [21D] had a queue of DSM signals awaiting processing in its message buffer. This means that at Step SD37 the new DSM signal from Data Handler B [21B] was placed in the message buffer to await processing in turn. It is not actually received by Data Handler D [21D] until Step SD38, but Data Handler D [21D] then fetches the descriptor at Step SD39. In this example, Data Handlers C and D [21C, 21D] are both carrying out the same task and so are both directed to the same descriptor [24]. They are carrying it out on different data, which might be carried in their respective DSM signals or alternatively the DSM signals might carry further memory addresses where the data can be found.

Having fetched the descriptor [24], Data Handler D [21D] executes it as if there had been no delay, including preparing a DSM signal addressed to Data Handler A [21A] at Step S310. This is then sent to Data Handler A [21A], notifying it that the entire process is complete.

The total number of potential DSM signals must never exceed the capacity of the message FIFOs to which they are written. In the above case, where the signals are primarily being sent to dumb engines, this is handled by the controlling CPU [21A] not issuing DSM signals to the engines [21B, C, D] unless it is certain that it has space to receive all the status returns that may be generated as a result of those commands and that the engines [21B, C, D] will have space to receive DSM signals sent to them.

Such a technique could also be used with CPUs organised in a strict master/slave relationship. However, this is not ideal as CPUs are relatively intelligent and may need to communicate asynchronously, with DSM signals not generated in response to particular commands. A sending CPU must know that there is space in the receiving CPU's message FIFO before it sends a DSM signal. As such, a slightly different system is used where there are multiple CPUs.

FIG. 4 shows a system with three CPUs [41, 42, 43] on a single chip, each with a message FIFO [44, 45, 46], connected to a bus [47] in a situation where the system has just been started up. The three CPUs [41, 42, 43] are able to communicate with one another through DSM signals as hereinbefore described, but because they are all able to act independently and not only under instructions as is the case for a dumb engine, each CPU [41, 42, 43] needs to be aware of the space available for its messages in the message FIFOs [44, 45, 46] of all the connected CPUs [41, 42, 43].

As with dumb engines that expect to receive DSM signals from multiple sources, each CPU [41, 42, 43] has a number of slots in its message FIFO [44, 45, 46] allocated to each other CPU [41, 42, 43], such that there are essentially multiple FIFOs connected to each CPU [41, 42, 43]. Each CPU [41, 42, 43] is aware of the number of slots in its message FIFO [44, 45, 46] that are actually available for the use of the other CPUs [41, 42, 43], though in FIG. 4 this space is shown greyed out.

When the system starts up, each CPU [41, 42, 43] believes that there is only one slot available for it in every other message FIFO [44, 45, 46]. In FIG. 4, these slots are shown by the patterning of the FIFOs [44, 45, 46], such that the first CPU [41] has no shading and its slots in the message FIFOs [45, 46] of the other two CPUs [42, 43] also have no shading. This CPU [41] will be used as an example, but the other two CPUs [42, 43] behave in an identical way.

The first CPU [41] initially reserves space in its message FIFO [44] for both the other CPUs [42, 43] as well as any dumb engines from which it might expect DSM signals. The amount of space for each CPU [42, 43] is determined by allocation at software design time. The CPU [41] then uses the single slot it believes it has access to [48] in the second CPU's [42] message FIFO [45] to send a DSM signal to the second CPU [42] informing it of the space assigned to it. The second CPU [42] will update its configuration accordingly.

This could be done through configuration registers in each CPU [41, 42, 43] holding the number of slots available in the other CPUs [41, 42, 43] and the connected engines. Whenever any CPU [41, 42, 43] or engine sends a DSM signal to a CPU [41, 42, 43], it puts the number of slots available for the use of that CPU [41, 42, 43] or its processes into the message and the CPU [41, 42, 43] records them in the configuration registers. This would require no-operation DSM signals to be sent periodically if there were no operations needed, but this would be possible due to the flexible format of the DSM signal.

The same process is followed by the first CPU [41] for the third CPU [43] and the second and third CPUs [42, 43] likewise follow the same process. In this way, all three CPUs [41, 42, 43] can be made aware of the space available for DSM signals in the message FIFOs [44, 45, 46] of all connected CPUs [41, 42, 43] and can therefore ensure that they do not send DSM signals to any CPU [41, 42, 43] that does not have space for it. This reduces the chance of the signal being lost.

If there are multiple CPUs and multiple devices, a single device can be shared between multiple CPUs by splitting the message FIFO in a similar way to a CPU that is expecting to receive DSM signals from multiple other CPUs. Each controlling CPU is then allowed to submit as many descriptors (identified by address/length) as can fit in its allocated space in the engine's message FIFO. It is up to the issuing CPU to ensure that the status address and partial data programmed into the descriptor route any DSM signal produced by the process to an appropriate place.

Although only a few particular embodiments have been described in detail above, it will be appreciated that various changes, modifications and improvements can be made by a person skilled in the art without departing from the scope of the present invention as defined in the claims. For example, hardware aspects may be implemented as software where appropriate and vice versa. Furthermore, instructions to implement the method may be provided on a computer readable medium.

For example, from a different perspective, the current art may be considered as follows:

A controlling processor commands a device to perform an action by doing one or more register writes.

When the action completes, the device notifies the processor that it requires attention. It does this by asserting an interrupt line (old fashioned) or sending an MSI containing an interrupt number (modern). The effect of the MSI is to set an interrupt line/request locally at the controlling processor, so it is the moral equivalent of an interrupt line without the wiring.

The CPU notices, by architecture dependent means, that the interrupt line/request has been set, and performs one or more register reads on the peripheral (perhaps from an interrupt program) to determine the reason for the interrupt, and if necessary extract data from the device.

Note that there is a simplicity about the interrupt arrangement: since it is effectively a single bit, whether carried by wire or MSI, it does not matter it is is asserted many times. It is simply a call for attention: if multiple calls for attention are needed, they simply keep re-setting the same interrupt request. There is no need for extra hardware, but the interrupt program which responds to the request must be aware that there may be multiple events to be processed.

The core of at least some embodiments of the present invention is that the one-bit interrupt request (albeit carried by an MSI) is replaced with a register write. The address to which the write is performed is programmed as part of the device command. The data of the write is an arbitrary combination, defined by the needs of the system, of data pre-programmed in the same way as the address, and data generated by the device—usually some form of status. As a first instance, that will be writing the status to a predefined receiving register on the controlling CPU. Typically, the controlling software will allocate some bits programmed to identify which command has completed, and the device will insert other bits to indicate the status of the completed command.

This means that there is no longer a need for the CPU to perform status reads, which (travelling across chip) may take a while: the status is delivered to the CPU, which can handle it locally.

However, this gain comes at a cost. Status writes are no longer idempotent, unlike interrupt requests: they carry data, which must not be overwritten when (if it is possible, as it is in systems of the sort we consider) the device can send multiple statuses. Therefore, there is provided a storage mechanism, typically but not necessarily a fifo, to receive and hold multiple status writes, be it from one device or many. Such storage will have finite capacity. The controlling software should therefore, by design, condition the devices it controls such that the number of status values (usually the responses to commands) cannot exceed the available storage. As data is removed from the storage, freeing space, more commands (that will eventually generate status writes) can be issued. And the register write operation, whatever it may be, must be atomic. Multiple devices may try to write to the same fifo-like storage: their data must be strictly queued.

This provides a modest gain: status is delivered to the controlling processor instead of it having to go out, expensively in time, to fetch it. However, there is a symmetry: an operation is started by register writes, status is signalled by a register write. By appropriate arrangement of the address and data for the status write, the status write which terminates an operation on one device can become the command write which starts an operation on another device. Since the status write occurs immediately upon command completion, any data generated from that operation is presumably ready for processing. If, therefore, there is a pipelined system, where multiple devices take as input a preceding devices output, this mechanism triggers the devices in series at the highest possible speed, while avoiding the possibility of race conditions which would occur if the devices were started together, or the delays if the processor has to respond to an interrupt from the first device before starting the second device.

Multiple devices can be arbitrarily chained, with the last device sending its status back to the controlling CPU, reporting the result of the whole chain of operations. And, of course, there exists the possibility of fan-out: the devices could generate multiple register writes. These could be used to start multiple downstream devices, or to report the completion of a first phase to the controller (which can therefore release resources no longer needed) while almost simultaneously starting the second phase on another device.

A particular pattern that is frequently, but not necessarily, used in such systems is that devices are controlled by descriptor blocks in memory, and the command to start a device is the address and length of the descriptor block, which can fit into a single atomic register write. This means that, once the controlling CPU has written the descriptor block, the command to execute the descriptor is a single register write—exactly what we need here. The descriptor can then contained the address and pre-programmed data values for the status (or command to another device) to be sent on command completion. While not necessary, this provides a simple but elegant means of setting up cascaded commands.

Having gone this far with a peripheral oriented system, where a programmable CPU is controlling one or more relatively dumb processing devices, we note that this mechanism also provides for an improved interprocessor communications mechanism should our system have, as many SOCs nowadays do, several moderately programmable general purpose CPUs. The same mechanism of a register write by one device which puts the register data into a fifo-like memory in the receiver can be used to convey messages from one CPU to another—provided their content does not exceed the amount that can be written atomically, as described above.

As before, the total number of potential register writes must never exceed the capacity of the fifos to which they are written. In the first, device, case, this is handled by the controlling computer not issuing commands to the devices unless it is certain that it has space to receive all the status returns that may be generated as a result of those commands. Such a technique could be used with CPUs organised in a strict master/slave relationship. But the whole point of CPUs is that they are relatively intelligent, and may want to communicate asynchronously, with messages not generated in response to particular commands. The problem is that a sending CPU must know that there is space in the receiving CPU's fifo-like memory before it sends a message.

This is achieved by all CPUs reserving space for each possible sender, and informing those senders of the current available space from time to time. Such information could be sent by reserving a number of bits in the messages sent to convey a "credit" to potential senders, or by sending special messages to carry the credit. The former mechanism, resembles, but is different from, the TCP window in the TCP/IP transport protocol.

If there are multiple CPUs and multiple devices, by fitting a device with a command fifo-like memory as used for receiving the statuses, and probably by using the memory-based descriptors described above, a single device can be shared between multiple CPUs. The space in the command fifo is split, by allocation at software design time, between the various CPUs. Each is allowed to submit as many descriptors (identified by address/length) as can fit in its fifo allocation. It is up to that issuer to ensure that the status address and partial data programmed into the descriptor route the status to an appropriate place.

If bought in IP (the USB Mac, in our case) has a "traditional" interrupt request, one can convert it to this scheme by including a unit which will generate a pre-programmed status write when the interrupt line is asserted. A virtue of this is that one does not to decide as SOC design time which CPU to wire the interrupt to—it is decided by software at run time. (This has not been covered in previous discussions, I think).

Thus a single design provides both sophisticated device control and inter-CPU communications. The cost, compared to prior art, is having wide fifos instead of single signal lines or single bit registers. Historically, that cost would have been daunting. In the context of today's SOC, with many millions of gates available, it is now small, and well worth it for the performance gains and the orthogonality of combining device and interprocessor communications into a single model.

The invention claimed is:

1. A heterogeneous multi-core integrated circuit comprising a plurality of processors, at least one processor of the plurality of processors being a general purpose CPU and at least one processor of the plurality of processors being a specialized hardware processing engine, the plurality of processors being connected by a common processor local bus on the integrated circuit, wherein a first general purpose CPU of the at least one general purpose CPU is configured to:

generate a first instruction for an atomic operation to be performed by a second processor, different from the first general purpose CPU, the second processor being either a second general purpose CPU or the specialized hardware processing engine, the first instruction comprising an address of the second processor and a first action to be executed by the second processor; and transmit the first instruction to the second processor over the common processor local bus;

wherein the first instruction causes the second processor to transmit a second instruction for another atomic operation to a third processor;

wherein the second processor has a first portion of memory comprising a number of slots allocated for receiving instructions from the first general purpose CPU and a second portion of memory comprising a number of slots allocated for receiving instructions from the third processor, and the third processor has a third portion of memory comprising a number of slots allocated for receiving instructions from the second processor and a fourth portion of memory comprising a number of slots allocated for receiving instructions from the first general purpose CPU; and the first general purpose CPU is configured to determine, based on a configuration register indicating numbers of available slots in the first, second, third, and fourth portions of memory, before the first general purpose CPU transmits the first instruction to the second processor, that there is space available in the first portion of memory for receiving the first instruction from the first general purpose CPU and that there is space available in the third portion of memory for receiving the second instruction from the second processor.

2. The heterogeneous multi-core integrated circuit according to claim 1, wherein the first action:

specifies the first action that is to be performed; or comprises at least one descriptor indicating what the first action comprises; or is pre-programmed in the second processor and is invoked by the first action; or comprises a pointer to at least one descriptor located in memory indicating what the first action comprises.

3. The heterogeneous multi-core integrated circuit according to claim 1, wherein the first instruction comprises data on which the first action is to be performed, when executed and/or a pointer to data located in memory on which the first action is to be performed, when executed.

4. The heterogeneous multi-core integrated circuit according to claim 1, further comprising an input buffer for storing the received first instruction until the second instruction is read by the second processor and the first action is executed.

5. The heterogeneous multi-core integrated circuit according to claim 4, wherein the second instruction includes information indicating the amount of space available in the input buffer for storage of other instructions.

6. The heterogeneous multi-core integrated circuit according to claim 1, wherein the processor local bus comprises any one of a Wishbone Bus, a CoreConnect bus, an Advanced Microcontroller Bus Architecture (AMBA) Bus, or an Advance eXtensible Interface (AXI) Bus.

7. A method of communication on a heterogeneous multi-core integrated circuit comprising a plurality of processors, at least one processor of the plurality of processors being a first general purpose CPU and at least one processor of the plurality of processors being a specialized hardware processing engine, the plurality of processors being connected by a common processor local bus on the integrated circuit, wherein the method comprises:

generating a first instruction for an atomic operation to be performed by a second processor, different from the first general purpose CPU, the second processor being either a second general purpose CPU or the specialized hardware processing engine, the first instruction comprising an address of the second processor and a first action to be executed by the second processor; and transmitting the first instruction to the second processor over the common processor local bus;

wherein the first instruction causes the second processor to transmit a second instruction for another atomic operation to a third processor;

wherein the second processor has a first portion of memory comprising a number of slots allocated for receiving instructions from the first general purpose CPU and a second portion of memory comprising a number of slots allocated for receiving instructions from the third processor, and the third processor has a third portion of memory comprising a number of slots allocated for receiving instructions from the second processor and a fourth portion of memory comprising a number of slots allocated for receiving instructions from the first general purpose CPU; and the first general purpose CPU is configured to determine, based on a configuration register indicating numbers of available slots in the first, second, third, and fourth portions of memory, before the first general purpose CPU transmits the first instruction to the second processor, that there is space available in the first portion of memory for receiving the first instruction from the first general purpose CPU and that there is space available in the third portion of memory for receiving the second instruction from the second processor.

8. The method according to claim 7, wherein the first action:

specifies the first action that is to be performed; or comprises at least one descriptor indicating what the first action comprises; or is pre-programmed in the second processor and is invoked by the first action; or comprises a pointer to at least one descriptor located in memory indicating what the first action comprises.

9. The method according to claim 7, wherein the first instruction comprises data on which the first action is to be performed, when executed and/or a pointer to data located in memory on which the first action is to be performed, when executed.

10. The method according to claim 7, further comprising storing the received first instruction in an input buffer until the first instruction is read by the second processor and the first action is executed.

11. The method according to claim 10, wherein the second instruction includes information indicating an amount of space available in the input buffer for storage of other instructions.

12. The method according to claim 7, wherein the processor local bus comprises any one of a Wishbone Bus, a CoreConnect bus, an Advanced Microcontroller Bus Architecture (AMBA) Bus, or an Advance eXtensible Interface (AXI) Bus.

* * * * *